Dec. 19, 1961   D. H. KEENEY   3,013,743
INTER-AIRCRAFT ATTACHING MECHANISM
Filed July 29, 1957
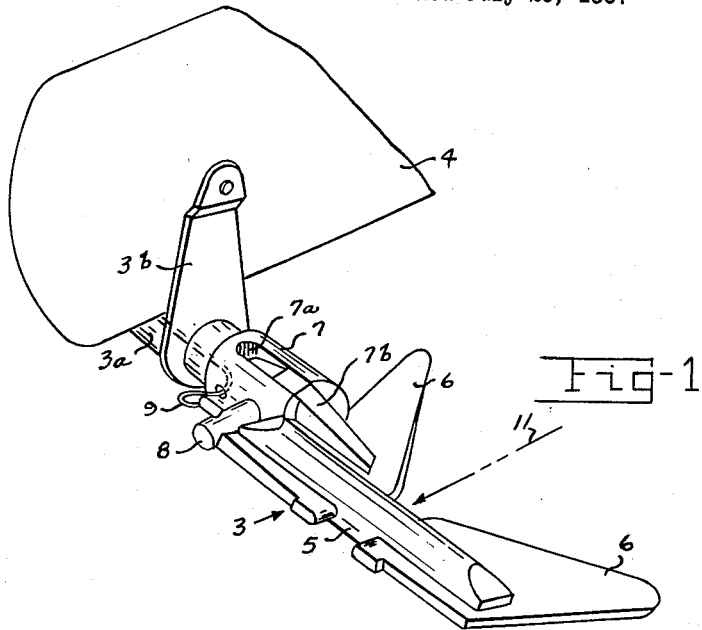
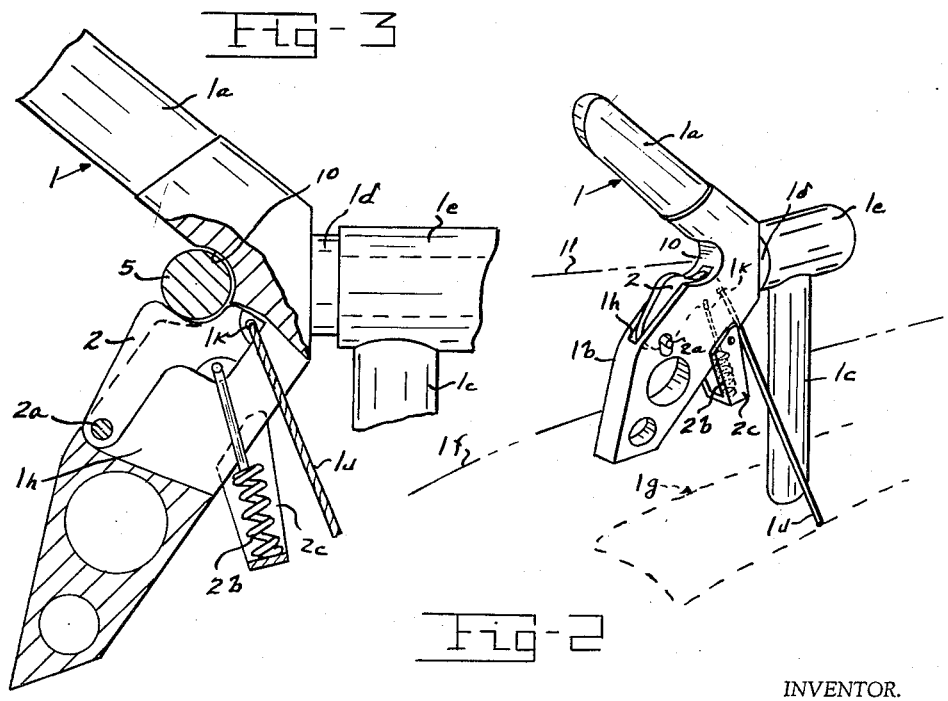
INVENTOR.
DONALD H. KEENEY
BY
ATTORNEYS

United States Patent Office 3,013,743
Patented Dec. 19, 1961

3,013,743
INTER-AIRCRAFT ATTACHING MECHANISM
Donald H. Keeney, Chagrin Falls, Ohio, assignor to the United States of America as represented by the Secretary of the Air Force
Filed July 29, 1957, Ser. No. 674,989
1 Claim. (Cl. 244—3)

This invention relates to towing means whereby a parasite type of aircraft may be attached in flight to a carrier type of aircraft, and more particularly to an inter-aircraft attaching means whereby the parasite aircraft may be attached in close coupled relation to the carrier aircraft at anytime and released at will, either from the parasite aircraft or from the carrier aircraft.

An object of the invention is the provision of a simple, inexpensive, light weight towing attachment for airplanes whereby a parasite aircraft can be connected for towing, or disconnected from a towing position below a carrier aircraft for free flight.

A further object includes the provision of a pair of rigid interengaging forklike guide members disposed in planes parallel to the direction of flight of the carrier and parasite aircrafts but in planes perpendicular to each other and means for latching the forked members together.

A further object is the provision of means for detachably connecting the fuselage portion of a parasite aircraft to the body of a carrier aircraft, comprising a horizontally bifurcated probe receiver mounted on a suitable supporting structure comprising a rigid cylindrical rod with a pair of fixed symmetrically located tapering guide vanes extending rearwardly therefrom in a horizontal plane to receive a complementary bifurcated guide and coupling member facing forwardly above the fuselage of a parasite aircraft in a vertical plane including a pair of forwardly and outwardly inclined rigid guide members extending in a vertical plane having a towing socket for receiving the cylindrical rod member and releasable latch means for retaining the cylindrical rod member in the socket.

A further object is the provision of means for releasing the latch means from within the parasite aircraft.

A further object is the provision of means for disengaging the cylindrical rod and tapering guide vanes from within the carrier aircraft.

A further object includes explosive bolt means for connecting the cylindrical rod to the carrier aircraft and means for exploding the explosive bolt means from within the carrier for separating the parasite aircraft from the carrier aircraft independently of said latch means.

Other objects and advantages of the invention will become apparent from the following description and accompanying drawing in which like reference characters refer to like parts in the drawing.

In the drawing FIGURE 1 is a somewhat diagrammatic perspective view of a preferred embodiment of the invention illustrating the probe receiver or coupling means on the carrier aircraft just prior to engagement with the complemental probe or coupling means on the parasite aircraft.

FIGURE 2 is a somewhat diagrammatic perspective view, illustrating the complemental probe or coupling means on the parasite aircraft in the position for engaging the coupling on the carrier aircraft as shown in FIGURE 1, the top of the fuselage of the parasite aircraft being shown in phantom and the opening for retracting the probe being shown in dotted lines.

FIGURE 3 is a vertical sectional view through the coupling means in their engaged and secured relation.

Referring particularly to FIGURES 2 and 3 the reference numeral 1 denotes a bifurcated probe member having forwardly and outwardly diverging guide arms 1ª and 1ᵇ mounted on a vertical standard or support 1ᶜ, said arms disposed in a vertical plane. A rearwardly extending portion 1ᵈ is fixed in a cylindrical bearing portion or hub 1ᵉ at the upper end of the vertical towing or standard support and may be arranged for limited rotary adjustment in the hub 1ᵉ if desired.

The reference number 1ᶠ denotes the upper or top portion of the fuselage of a parasite aircraft and the towing standard 1ᶜ extends upwardly from the forward portion of the body of the parasite aircraft 1ᶠ and may be mounted in any suitable manner for retraction into the interior of the parasite aircraft when not in use, such as through a hatch or opening 1ᵍ as seen in dotted lines in FIGURE 2. The lower arm 1ᵇ of the probe 1 is socketed at 1ʰ to receive a latch member 2 which is pivoted at 2ª. A spring member 2ᵇ is provided for normally urging the shoulder of the latch 2 outwardly into the arcuate or circular socket or opening 10. One end of the spring is seated in a clip 2ᶜ while the other end is secured in a socket adjacent the free end of the latch, the spring being under compression.

The socket 10 is preferably circular or arcuate in cross section as shown in the drawing to provide a bearing seat for the cylindrical bar portion 5 of the probe receiver 3. The latch 2 is disposed to extend into the entrance of the socket 10 and is retractable from the socket 10 by a pull rod or cable 1ʲ extending into the parasite aircraft 1ᶠ for actuation. The cable 1ʲ is attached to the remote or free end of the latch at 1ᵏ. The arms 1ª and 1ᵇ preferably extend in a vertical plane as shown in the drawing and may be angularly adjustable with the socket 10 if desired about the axis of the hub 1ᵉ to allow for slight misalignments of the parasite aircraft in coupling and towing due to "banking" or rocking movements as and when coupled.

The probe receiver 3 comprises a horizontal towing rod 3ª extending laterally below the body of the carrier aircraft 4 and fixed in brackets 3ᵇ. The towing rod may be hollow or in the form of a tubular member or pipe to accommodate firing circuit wires from the interior of the body 4 of the carrier to the explosive bolt means 8, later described, for separating the probe receiver from the body 4 of the carrier aircraft, in the event of failure of release of the probe by retraction of the latch 2, from the parasite aircraft.

The probe receiver 3 includes a substantially horizontal cylindrical bar portion 5 disposed to engage the socket 10 of the probe 1 and is provided with rearwardly and outwardly tapering guide vanes 6 disposed horizontally and in a plane substantially parallel to the direction of flight of the carrier 4 to provide an outwardly and rearwardly extending guide opening which is perpendicular to the receiving opening in the probe member 1, leaving a horizontal cylindrical rod portion 5 therebetween.

The head portion 7 of the supporting rod 3ª is bifurcated at 7ª to receive a supporting plate or bracket member 7ᵇ through which an explosive bolt 8 extends to secure the probe receiver to the head portion 7 of the supporting rod 3ª.

The head portion 7 is preferably provided with an opening as seen in FIGURE 1 in communication with the interior of the tubular pipe or support 3ª and the firing circuit wires 9 extend through this opening for connection to a suitable explosive charge or squib in the explosive bolt 8.

In the coupling operation the carrier 4 and the parasite aircraft are flown into position substantially as shown in FIGURE 1 with the guide vanes 6 of the probe receiver and the guide arms 1ª and 1ᵇ of the probe 1 as shown in FIGURE 2 disposed in perpendicular relation to each other with the socket 10 disposed directly in rear of the portion of the cylindrical bar 5 as shown by the arrow 11 in FIGURE 1.

Upon advance of the parasite aircraft 1ᶠ relative to the carrier aircraft 4 in the same direction of flight the horizontally disposed guide vanes 6 and arms 1ª or 1ᵇ in the vertical plane will engage if any misalignment occurs either in vertical or horizontal planes and the circular horizontal bar portion 5 will be accurately guided into the socket 10. As the engagement or coupling is accomplished the latch 2 will be depressed and the spring 2ᵇ will immediately elevate the detent portion of the latch 2 to retain the bar member 5 in the socket 10.

Release is normally accomplished by a pull on the actuator rod or cable 1ʲ which withdraws the latch detent from the socket 10 allowing normal separation of the parasite aircraft from the carrier 4 in flight.

Should the separation not be accomplished from the parasite aircraft in the normal manner just indicated, for any reason, and separation was imperative, for instance for landing, the circuit to the explosive bolt 8 through the circuit connector lines 9 can be closed from within the carrier aircraft 4. This denotes the explosive bolt securing means 8 to eliminate its coupling function between the head 7 and the supporting plate element 7ᵇ, permitting the supporting plate element 7ᵇ to disengage and withdraw from its position in the slot 7ª between bifurcated socket or end of the head 7 whereby the parasite aircraft is released from the carrier aircraft 4.

The specific embodiment shown above has been given by way of illustration and not by way of limitation and is subject to modification and changes by those skilled in the art, without departing from the spirit of invention as defined by the scope of the accompanying claim.

I claim:

An inter-airplane coupling and towing means for releasably coupling a parasite airplane in flight to a carrier airplane and towing the same comprising a parasite airplane having a fuselage, and a towing airplane having a fuselage, a horizontal supporting bar fixed to said carrier airplane below the fuselage thereof and projecting laterally beyond one side of the fuselage, a cylindrical coupling bar portion fixed to said projecting portion of said bar, a pair of guide vanes fixed to the rear side of said cylindrical coupling bar portion in end to end spaced relation to provide an intermediate cylindrical coupling socket receiving portion therebetween; said guide vanes diverging rearwardly and outwardly in a plane substantially parallel to the direction of flight of said carrier airplane; a vertically disposed standard fixed to the top forward portion of the fuselage of said parasite airplane to project materially above said top portion; parasite coupling socket means fixed to the upper end of said substantially vertically disposed standard and facing forwardly for receiving the aforesaid intermediate cylindrical coupling socket receiving portion therein between the adjacent ends of said pair of rearwardly diverging guide vanes; a pair of forwardly diverging guide arms extending forwardly from each side of said parasite coupling socket means in a plane perpendicular to the plane of said diverging guide vanes; and latch means disposed on one of said forwardly diverging arms for releasably retaining said intermediate cylindrical coupling socket receiving portion in said parasite coupling socket means; whereby, when said guide arms on said overtaken parasite airplane and said guide vanes on said carrier airplane are substantially aligned for coupling and interengagement, the guide vanes will center the coupling socket means in one plane with the intermediate cylindrical coupling portion and the guide arms will center the coupling socket means with the intermediate cylindrical coupling portion in a plane perpendicular to the last mentioned plane, as the intermediate cylindrical coupling portion is received in said socket.

References Cited in the file of this patent

UNITED STATES PATENTS

| | | |
|---|---|---|
| 113,160 | Gregory | Mar. 28, 1871 |
| 579,981 | Irvin | Apr. 6, 1897 |
| 1,634,964 | Steinmetz | July 5, 1927 |
| 1,716,670 | Sperry | June 11, 1929 |
| 1,869,487 | Lefevre et al. | Aug. 2, 1932 |
| 1,926,968 | Causan | Sept. 12, 1933 |
| 2,388,013 | Rasor | Oct. 30, 1945 |
| 2,443,629 | Matuszewski | June 22, 1948 |
| 2,489,984 | Shoemaker | Nov. 29, 1949 |
| 2,679,783 | Smith | June 1, 1954 |
| 2,849,200 | Person | Aug. 26, 1958 |